(12) United States Patent
Hurst

(10) Patent No.: US 7,093,847 B2
(45) Date of Patent: Aug. 22, 2006

(54) INSTRUMENT PANEL ADAPTER FOR AIRBAG MOUNT

(75) Inventor: William Todd Hurst, Greensboro, NC (US)

(73) Assignee: Takata Restraint Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/723,974

(22) Filed: Nov. 26, 2003

(65) Prior Publication Data

US 2005/0110245 A1    May 26, 2005

(51) Int. Cl.
B60R 21/16    (2006.01)
(52) U.S. Cl. .................................... 280/728.2; 280/732
(58) Field of Classification Search ............. 280/728.1, 280/728.2, 732
See application file for complete search history.

(56) References Cited

U.S. PATENT DOCUMENTS

| | | | |
|---|---|---|---|
| 4,106,887 A | 8/1978 | Yasuike et al. | 425/549 |
| 4,740,150 A | 4/1988 | Sayer | 425/542 |
| 4,905,901 A | 3/1990 | Johnson | 239/135 |
| 5,135,252 A | 8/1992 | Suran et al. | 280/732 |
| 5,164,200 A | 11/1992 | Johnson | 425/130 |
| 5,204,051 A | 4/1993 | Jaroschek | 264/572 |
| 5,230,530 A | 7/1993 | Iriyama et al. | 280/732 |
| 5,234,227 A | 8/1993 | Webber | 280/728 |
| 5,259,642 A | 11/1993 | Muller et al. | 280/732 |
| 5,348,339 A * | 9/1994 | Turner | 280/728.3 |
| 5,356,174 A | 10/1994 | Rhein et al. | 280/728 |
| 5,370,416 A | 12/1994 | Hamada | 280/728 |
| 5,378,138 A | 1/1995 | Onuma et al. | 425/549 |
| 5,419,583 A | 5/1995 | Sakakida et al. | 280/728.2 |
| 5,431,432 A | 7/1995 | Webber et al. | 280/728.2 |
| 5,433,471 A | 7/1995 | Shepherd et al. | 280/728.2 |
| 5,489,116 A | 2/1996 | Boag | 280/728.2 |
| 5,527,063 A * | 6/1996 | Garner et al. | 280/728.2 |
| 5,560,644 A | 10/1996 | Fiore | 280/728.2 |
| 5,613,699 A | 3/1997 | Schambre | 280/728.2 |
| 5,639,112 A | 6/1997 | Phillion et al. | 280/728.2 |
| 5,662,350 A | 9/1997 | Bathon et al. | 280/728.2 |
| 5,798,130 A | 8/1998 | VonHoldt | 425/549 |
| 5,803,487 A | 9/1998 | Kikuchi et al. | 280/728.2 |
| 5,876,058 A | 3/1999 | Nemoto | 280/728.2 |
| 5,979,929 A | 11/1999 | Strager et al. | 280/728.2 |
| 6,022,043 A * | 2/2000 | Harnisch et al. | 280/728.2 |
| 6,039,341 A | 3/2000 | Doxey et al. | 280/728.2 |
| 6,042,140 A | 3/2000 | Blazaitis et al. | 280/728.3 |
| 6,159,000 A | 12/2000 | Puri et al. | 425/562 |
| 6,161,865 A * | 12/2000 | Rose et al. | 280/728.3 |
| 6,179,604 B1 | 1/2001 | Takeda | 425/547 |
| 6,250,669 B1 * | 6/2001 | Ohmiya | 280/732 |
| 6,296,802 B1 | 10/2001 | Blazaitis et al. | 264/328.1 |
| 6,338,499 B1 * | 1/2002 | Ueno et al. | 280/732 |
| 6,601,870 B1 * | 8/2003 | Suzuki et al. | 280/728.3 |

FOREIGN PATENT DOCUMENTS

JP    2001171455 A    6/2001

* cited by examiner

Primary Examiner—Eric Culbreth
(74) Attorney, Agent, or Firm—Foley & Lardner LLP

(57) ABSTRACT

An adapter comprises a peripheral wall incorporating a plurality of apertures adapted to cooperate with a corresponding plurality of hooks depending from side walls of an airbag retainer. A flange projecting from the peripheral wall provides for attaching the adapter and airbag retainer to a vehicle instrument panel. The adapter incorporates an opening therethrough defined by the peripheral wall, through which the airbag is deployed. In one aspect, the peripheral wall is discontinuous.

20 Claims, 3 Drawing Sheets

INSTRUMENT PANEL ADAPTER FOR AIRBAG MOUNT

TECHNICAL FIELD

The present invention relates generally to airbag systems and housings for airbag systems, and more particularly relates to an adapter for facilitating attachment between an airbag retainer and a vehicle instrument panel.

BACKGROUND OF THE INVENTION

Passenger side inflatable restraint systems have become standard equipment on most motor vehicles. In a typical system, an airbag housing is provided, within which a folded airbag cushion is positioned. A gas generator or inflator is positioned such that it may supply an inflation fluid to an interior of the airbag in the event of a crash or other sudden vehicle deceleration. Various designs are known for mounting the housing within the vehicle. For example, the housing may be mounted to the vehicle cross car beam, and/or to various portions of the instrument panel. Engineers have experimented with various designs for different mounting arrangements; however, a continual challenge has been developing mounting arrangements that are suitable for use in different vehicle models. Similarly, variations among the actual dimensions of vehicles of the same make and model can provide challenges to successfully mounting airbag housings therein during assembly or service.

BRIEF SUMMARY OF THE INVENTION

In one aspect, the present invention provides an adapter for attaching an airbag retainer to an instrument panel in a vehicle. The adapter preferably includes a molded plastic body having a plurality of integral wall portions adapted to attach with a substantially rectangular airbag retainer, and a substantially planar flange projecting outwardly from the wall portions, the flange being adapted to attach with a vehicle instrument panel. A plurality of apertures are preferably formed along at least one of the wall portions and are adapted to receive hooks projecting from the airbag retainer.

DETAILED DESCRIPTION

Figure 2:
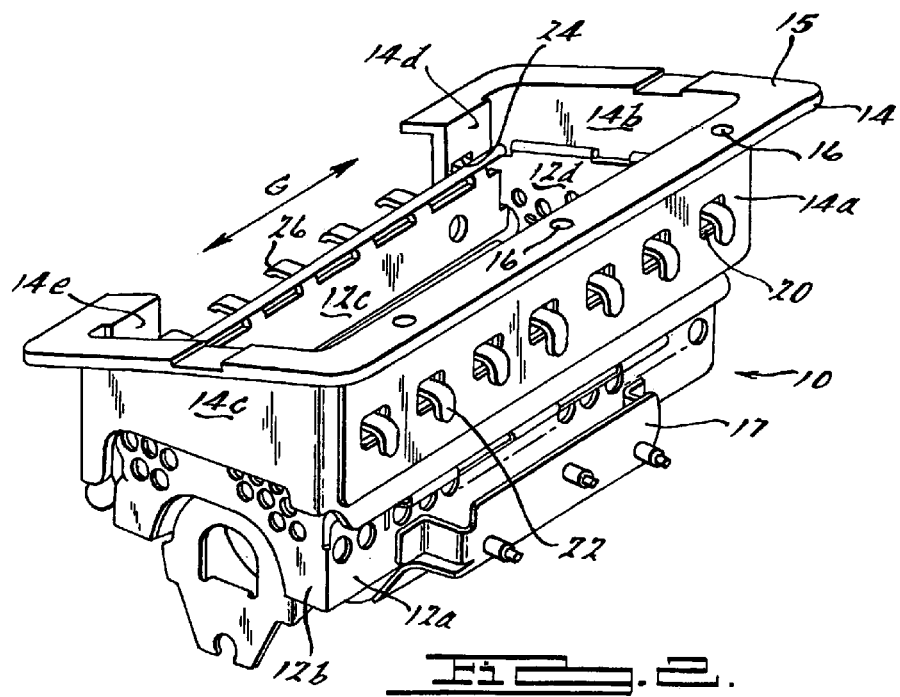
FIG. 2 is a perspective view of an airbag housing according to a preferred embodiment of the present invention.

The present invention broadly comprises an adapter for facilitating mounting of a retainer for an inflatable safety restraint device in a motor vehicle. In other, related aspects the invention includes an airbag housing and inflatable restraint system. Referring to FIG. 2, there is shown a housing comprising an airbag retainer 10 and adapter 14 according to a preferred embodiment of the present invention. Retainer 10 is preferably constructed from a plurality of panels, designated in FIG. 2 as 12a, 12b, 12c and 12d, attached to form a substantially rectangular receptacle for receipt and storage of an inflatable restraint device. Various mounting members, fasteners, etc. may be attached to, or formed integrally with retainer 10 to facilitate attachment with, for example, the vehicle cross car beam. For example, a mounting member 17 may be positioned on panel 12a, allowing fasteners attached thereto to be engaged with a vehicle cross car beam. The panels comprising retainer 10 are preferably further adapted to facilitate attachment with a gas generator device or inflator. Embodiments are contemplated wherein a plurality of panels, for example two end panels and two side panels, are attached to form a substantially rectangular retainer body. Alternative embodiments are also contemplated wherein the retainer is manufactured from a lesser number of panels, formed integrally from one or more pieces of stock, as well as embodiments wherein the retainer comprises a non-rectangular shape. All the component parts of the present invention are manufactured from known materials and by known processes.

Adapter 14 is preferably injection molded plastic, and includes a plurality of wall portions, preferably forming a discontinuous rectangular shape, as illustrated in FIG. 2. Although in the preferred embodiments described herein, adapter 14 is substantially rectangular, alternative embodiments are contemplated wherein adapter is non-rectangular. Most broadly, adapter 14 comprises a first peripheral wall adapted to attach with mounting members in a vehicle, and an attached second peripheral wall that depends from the first peripheral wall and is adapted to attach with an airbag housing or retainer. Adapter 14 preferably comprises a first side wall 14a, two end walls 14b and 14c, and second and third side walls 14d and 14e, substantially opposite first side wall 14a. Adapter 14 is preferably discontinuous about a periphery thereof. As used herein, the term "discontinuous" refers to a gap along one of the sides of the shape, preferably a rectangle, defined by adapter 14. In FIG. 2, this gap is denoted "G." This gap facilitates flexing of adapter 14 to allow engagement with retainer 10, as described herein. Although gap G is shown separating second and third sidewalls 14d and 14e, a similar gap could be positioned along any edge of adapter 14. Further, gap G is not critical at all; rather, adapter 14 could be constructed from a sufficiently flexible plastic that it could be fitted over retainer 10, in spite of being continuous around its periphery. Further still, adapter 14 need not be flexed at all to engage with an airbag retainer. For example, adapter 14 might be formed having dimensions sufficient that the airbag retainer fits inside or outside the periphery of adapter 14 without any necessary flexure of adapter 14.

A substantially planar first peripheral wall or flange 15 preferably projects outwardly from walls 14a–14e, and may include holes 16 for receipt of mounting fasteners or some other means whereby it is attachable with mounting members in a vehicle. Alternative embodiments are contemplated wherein flange 15 projects inwardly relative to walls 14a–e. In a preferred embodiment, bolts, screws, etc. can be used to attach adapter 14 (and the associated retainer) to portions of a vehicle instrument panel. Wall 14a is a first sidewall, and preferably has a height that is substantially constant along a length thereof. Walls 14b and 14c, second and third sidewalls, respectively, preferably have heights that decrease in a direction away from first sidewall 14a. Thus, a plane defined by flange 15 slopes relative to planes defined by walls 14a–e. Walls 14d and 14e preferably have substantially constant heights.

A plurality of apertures 20 are preferably formed along sidewall 14a, and receive mounting hooks 22 preferably projecting from panel 12a. Sidewalls 14d and 14e further are preferably formed having apertures 24 adapted to receive hooks 26 projecting from another panel 12c of retainer 10. In a preferred embodiment, hooks 22 and 26, and apertures 20 and 24 are spaced and sized such that adapter 14 can "float" relative to retainer 10, for example, by forming apertures 24 with widths greater than hooks 22 and 26. By fashioning retainer 10 and adapter 14 such that adapter 14 has this relative float, greater mounting flexibility is possible. For example, there is a degree of variability in the actual dimensions of the instrument panel and various other vehicle features that are involved in mounting of retainer 10 and adapter 14, and consequently, there is some inevitable variation in the optimal positions and dimensions of the various components among vehicles. Allowing relative movement between adapter 14 and retainer 10 lets one or the other of the respective components accommodate a mounting arrangement that might otherwise not be possible. A further advantage relating to relative float between the housing and the mounting apparatus is the increased ease with which the module can be disengaged from mounts on the underside of the instrument panel.

Figure 3:
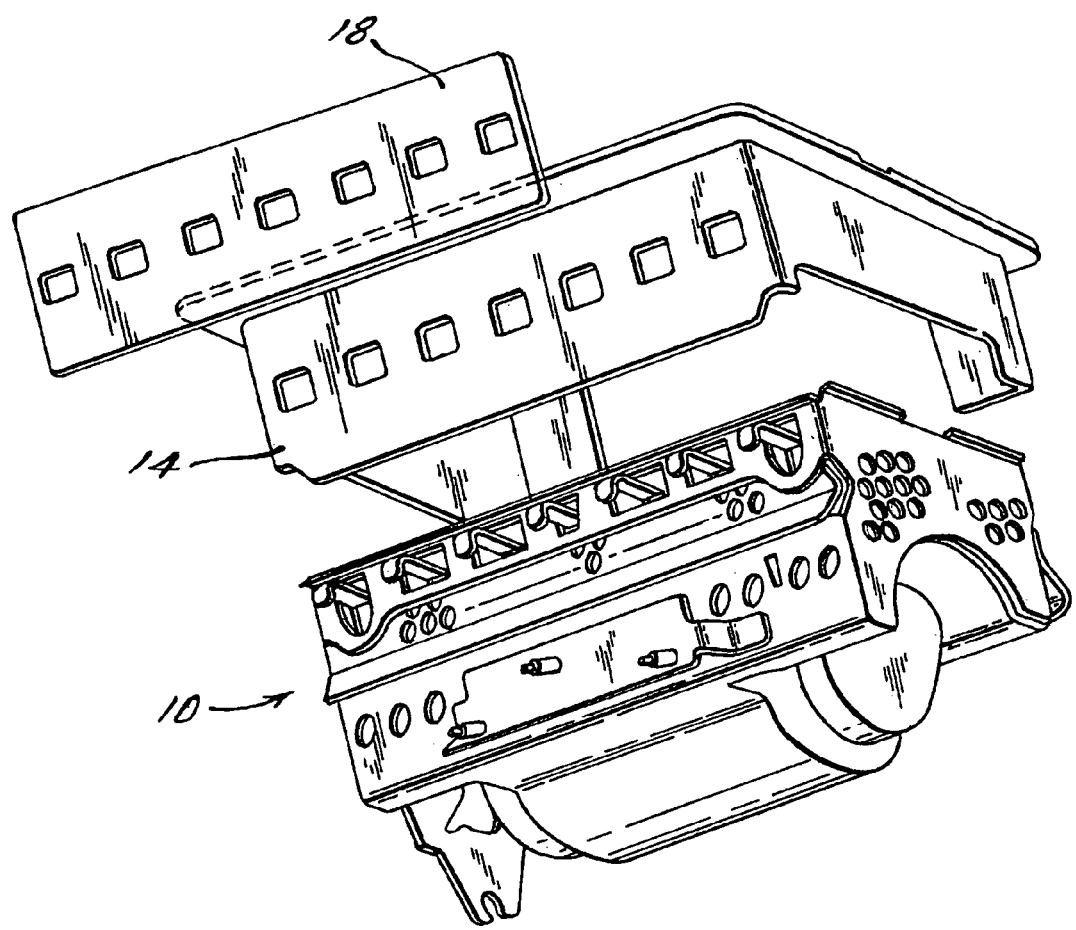
FIG. 3 is an exploded view of an airbag housing according to a preferred embodiment of the present invention.

Turning to FIG. 3, there is shown an exploded view of an airbag retainer 10 and adapter 14, similar to the components shown in FIG. 2. In the FIG. 3 embodiment, a metallic plate 18 is shown. Plate 18 is preferably molded integrally during injection molding of adapter 14, and provides enhanced stiffness for maintaining structural rigidity during airbag deployment. Thus, plate 18 assists in keeping the inflatable safety apparatus relatively fixed during deployment.

Figure 1:
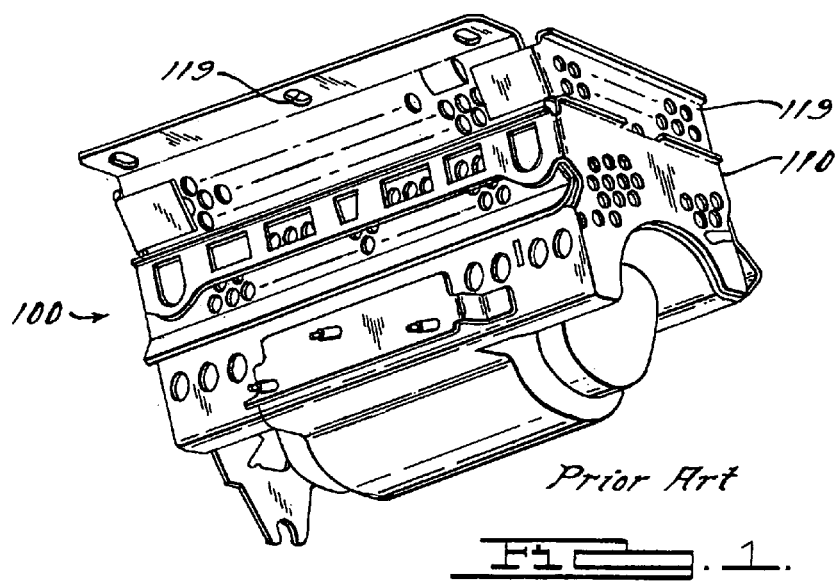
FIG. 1 is a perspective view of an airbag housing according to a known design.

Referring now to FIG. 1, there is shown an airbag housing 100 in accordance with a known design. Housing 100 includes a retainer 110 similar to retainer 10 of the present invention but differs, among other things, in that housing 100 provides a plurality of mounting panels 119. In a typical known system, mounting panels 119 are specially manufactured to mount a particular retainer in a vehicle. Due to variation in vehicle designs, the mounting panels 119 must be specially manufactured to accommodate a particular mounting arrangement.

Utilizing the presently disclosed plastic adapter provides for molding single piece plastic units for mounting a variety of retainers in a variety of vehicles. The excess parts and labor of manufacturing a specific mounting assembly for specific vehicles is eliminated. Moreover, various bolt hale patterns can be easily formed in flange 15, allowing the adapter to be easily changed to adapt to various mounting arrangements, either by altering the molded adapter design itself or by retrofitting existing adapters. Further still, the shape of the adapter can be varied by molding adapters having different structures, to conform, for example, with a shape of the underside of an instrument panel. The plastic adapter/metal retainer configuration can be designed to closely fit around obstructions, complex surfaces, or nearby parts, and reduces the weight of the assembly by substituting plastic for parts formerly constructed from metal.

Figure 4:
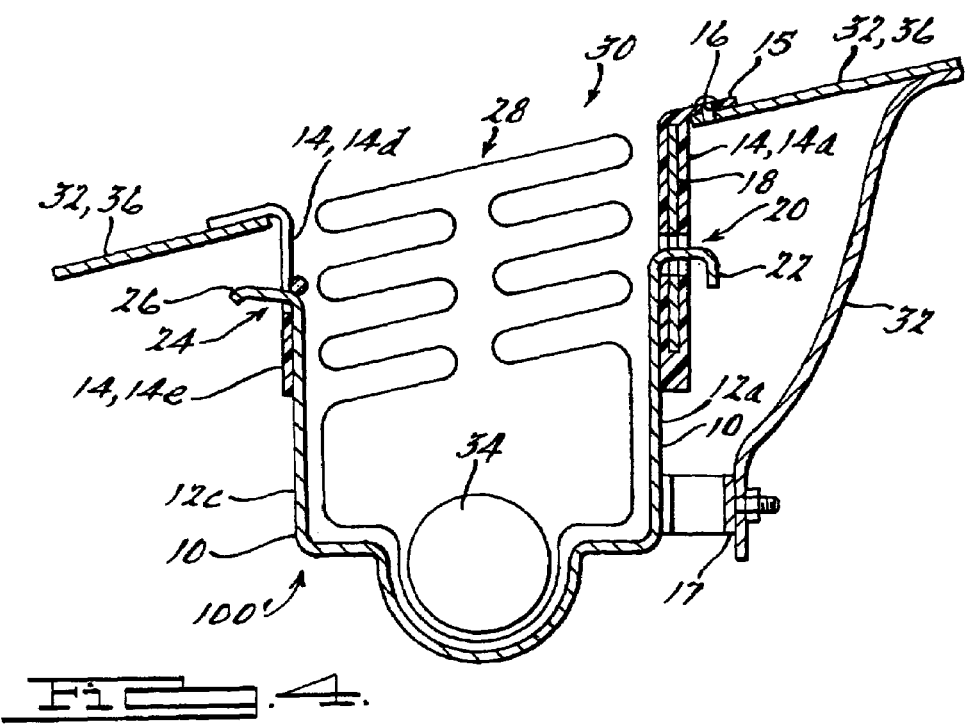
FIG. 4 is a schematic representation of an inflatable restraint system according to an embodiment of the invention.

Referring to FIG. 4, a housing 100' for an inflatable restraint system 30 comprises a plurality of retainer panels 12a–d attachable to form a substantially rectangular retainer body 12 for receipt of a folded inflatable restraint cushion 28, wherein at least one of the panels 12a includes a plurality of projecting hooks 22; a plastic adapter 14 comprising wall portions 14a–e positionable around the retainer body 10, and a flange 15 projecting substantially perpendicular to the wall portions 14a–e; wherein at least one of the wall portions 14a includes a plurality of apertures 20 for receipt of the hooks 22, the apertures 20 having widths greater than a width of the hooks 22 to allow relative movement therebetween.

Furthermore, an inflatable restraint system 30 for a motor vehicle 32 comprises a retainer 10 with a plurality of attachable panels 12a–d and a plurality of attachment hooks 22 projecting from at least one of the panels 12a; an inflatable restraint device 28 positioned in the retainer 10; a gas generator 34 operable to provide an inflation gas to the inflatable restraint device 28; and an adapter 14 for attaching the retainer 10 to a vehicle instrument panel 36, the adapter 14 comprising a peripheral wall 14a with a plurality of apertures 20 for receipt of the hooks 22, and a flange 15 projecting substantially perpendicular to the peripheral wall 14a.

A method of mounting an airbag retainer 10 for an inflatable occupant restraint system 30 in a motor vehicle 32 comprises the steps of: molding a plastic adapter 14 having a mounting flange 15 and at least one sidewall 14a–e depending from the flange 15, wherein the sidewall 14a–e is adapted to attach with an airbag retainer 10; attaching the molded plastic adapter 14 to an airbag retainer 10 for housing a folded airbag 28; and mounting the airbag retainer 10 in a vehicle 36 via an engagement of the mounting flange 15 with mounting members in an instrument panel 32 in the vehicle 36.

The present description is for illustrative purposes only, and should not be construed to narrow the breadth of the present invention in any way. Thus, those skilled in the art will appreciate that various modifications might be made to the presently disclosed embodiments without departing from the scope and spirit of the present invention in any way. Other aspects, features and advantages of the present invention will be apparent upon an examination of the attached drawing Figures and appended claims.

What is claimed is:

1. A housing for an inflatable restraint system, comprising:
  a plurality of retainer panels attachable to form a substantially rectangular retainer body for receipt of a folded inflatable restraint cushion, wherein at least one of said panels includes a plurality of projecting hooks; and
  a plastic adapter comprising wall portions positionable around the retainer body, and a flange projecting substantially perpendicular to said wall portions;
  wherein at least one of said wall portions includes a plurality of apertures for receipt of said hooks, said apertures having widths greater than a width of said hooks to allow relative movement therebetween, and said adapter comprises five wall portions defining a substantially rectangular shape with a discontinuous periphery.

2. The housing of claim 1, further comprising a metal reinforcing plate attached to at least one of said wall portions.

3. The housing of claim 2, wherein said adapter is overmolded about said plate.

4. An adapter for attaching an airbag retainer to an instrument panel in a vehicle, comprising:
  a molded plastic body having a plurality of integral planar wall portions adapted to attach with a substantially rectangular airbag retainer; and
  a substantially planar flange projecting outwardly from said wall portions, said flange adapted to attach with a vehicle instrument panel;
  wherein said molded plastic body includes a discontinuous periphery and said molded plastic body includes an opening therethrough at least partially defined by at least one of said wall portions and said flange.

5. The adapter of claim 4, wherein said plurality of wall portions includes: a first side wall having a substantially constant height; and second and third sidewalls oriented substantially perpendicular to said first sidewall and attached at opposite ends thereof, said second and third sidewalls having heights decreasing in a direction away from said first sidewall.

6. An adapter for attaching an airbag retainer to an instrument panel in a vehicle, comprising:
    a molded plastic body having a plurality of integral planar wall portions adapted to attach with a substantially rectangular airbag retainer, wherein said plurality of wall portions includes:
        a first side wall having a plurality of apertures formed therein for receipt of hooks; and
        a second and a third side wall positioned opposite said first side wall, each of said second and third side walls having a least one aperture formed therein for receipt of hooks; and
    a substantially planar flange projecting outwardly from said wall portions, said flange adapted to attach with a vehicle instrument panel;
    wherein said molded plastic body includes a discontinuous periphery.

7. The adapter of claim 6, wherein each of said second and third side walls includes a single aperture formed therein.

8. An inflatable restraint system for a motor vehicle, comprising:
    a retainer with a plurality of attachable panels and a plurality of attachment hooks projecting from at least one of said panels;
    an inflatable restraint device positioned in said retainer;
    a gas generator operable to provide an inflation gas to said inflatable restraint device; and
    an adapter for attaching said retainer to a vehicle instrument panel, said adapter comprising a peripheral wall with a plurality of apertures for receipt of said hooks, and a flange projecting substantially perpendicular to said peripheral wall, wherein said adapter comprises an opening therethrough, wherein said opening is at least partially defined by at least one of said peripheral wall and said flange, and said inflatable restraint device is adapted to deploy through said opening, and wherein said adapter defines a portion of a rectangle having a gap formed along one side thereof, said gap facilitating flexing of said adapter.

9. An inflatable restraint system for a motor vehicle, comprising:
    a retainer with a plurality of attachable panels and a plurality of attachment hooks projecting from at least one of said panels;
    an inflatable restraint device positioned in said retainer;
    a gas generator operable to provide an inflation gas to said inflatable restraint device; and
    an adapter for attaching said retainer to a vehicle instrument panel, wherein said adapter comprises: a peripheral wall including a first side wall having a plurality of apertures for receipt of said hooks, second and third side walls each having at least one aperture, wherein said second and third side walls are each opposite to said first side wall, and a flange projecting substantially perpendicular to said peripheral wall, wherein said adapter comprises an opening therethrough, wherein said opening is at least partially defined by at least one of said peripheral wall and said flange, and said inflatable restraint device is adapted to deploy through said opening.

10. The inflatable restraint system of claim 9, further comprising a metallic reinforcing plate attached along said first side wall, said plate having a plurality of apertures substantially aligning with the apertures formed in said first side wall.

11. The inflatable restraint system of claim 10, wherein said adapter is formed having apertures sized such that said adapter is movable relative to said retainer when engaged therewith.

12. An adapter for a vehicle air bag housing, comprising:
    a first peripheral wall defining an at least partially enclosed opening through which an inflating airbag may be projected, wherein said opening extends through said adapter and said first peripheral wall is adapted to engage with at least one mounting member in a vehicle dashboard; and
    a second peripheral wall depending from said first peripheral wall and adapted to engage with an airbag housing, said second peripheral wall defining a substantially rectangular opening, and comprising a discontinuous periphery.

13. The adapter of claim 12, wherein said first peripheral wall is substantially planar and oriented substantially perpendicular to said second peripheral wall.

14. The adapter of claim 13, wherein said first peripheral wall defines a substantially rectangular opening.

15. The adapter of claim 12, wherein said second peripheral wall comprises a plurality of integral wall portions arranged in a substantially rectangular fashion.

16. The adapter of claim 12, wherein said first peripheral wall defines a plane that slopes relative to said second peripheral wall.

17. The adapter of claim 12, wherein the first peripheral wall extends outwardly relative to the second peripheral wall.

18. An adapter for a vehicle air bag housing, comprising:
    a first peripheral wall defining an at least partially enclosed cross sectional area through which an inflating airbag may be projected, said first peripheral wall adapted to engage with at least one mounting member in a vehicle dashboard, wherein said first peripheral wall defines a substantially rectangular cross section and said first peripheral wall comprises a discontinuous substantially rectangular cross section; and
    a second peripheral wall depending from said first peripheral wall and adapted to engage with an airbag housing, wherein said first peripheral wall is substantially planar and oriented substantially perpendicular to said second peripheral wall.

19. A method of mounting an airbag retainer for an inflatable occupant restraint system in a motor vehicle, comprising the steps of:
    molding a plastic adapter having a mounting flange and at least one sidewall depending from the flange, wherein the sidewall is adapted to attach with an airbag retainer and said plastic adapter incorporates an opening therethrough, wherein said opening is at least partially defined by at least one of said mounting flange and said sidewall;
    attaching the molded plastic adapter to an airbag retainer for housing a folded airbag, wherein said folded airbag is adapted to deploy through said opening, and said molded plastic adapter includes a discontinuous periphery; and
    mounting the airbag retainer in a vehicle via an engagement of the mounting flange with mounting members in an instrument panel in the vehicle.

20. The method of claim 19, wherein the step of attaching the molded plastic adapter to an airbag retainer comprises flexing the plastic adapter to accommodate the airbag retainer inside a periphery of the sidewall.

* * * * *